United States Patent Office 3,432,056
Patented Mar. 11, 1969

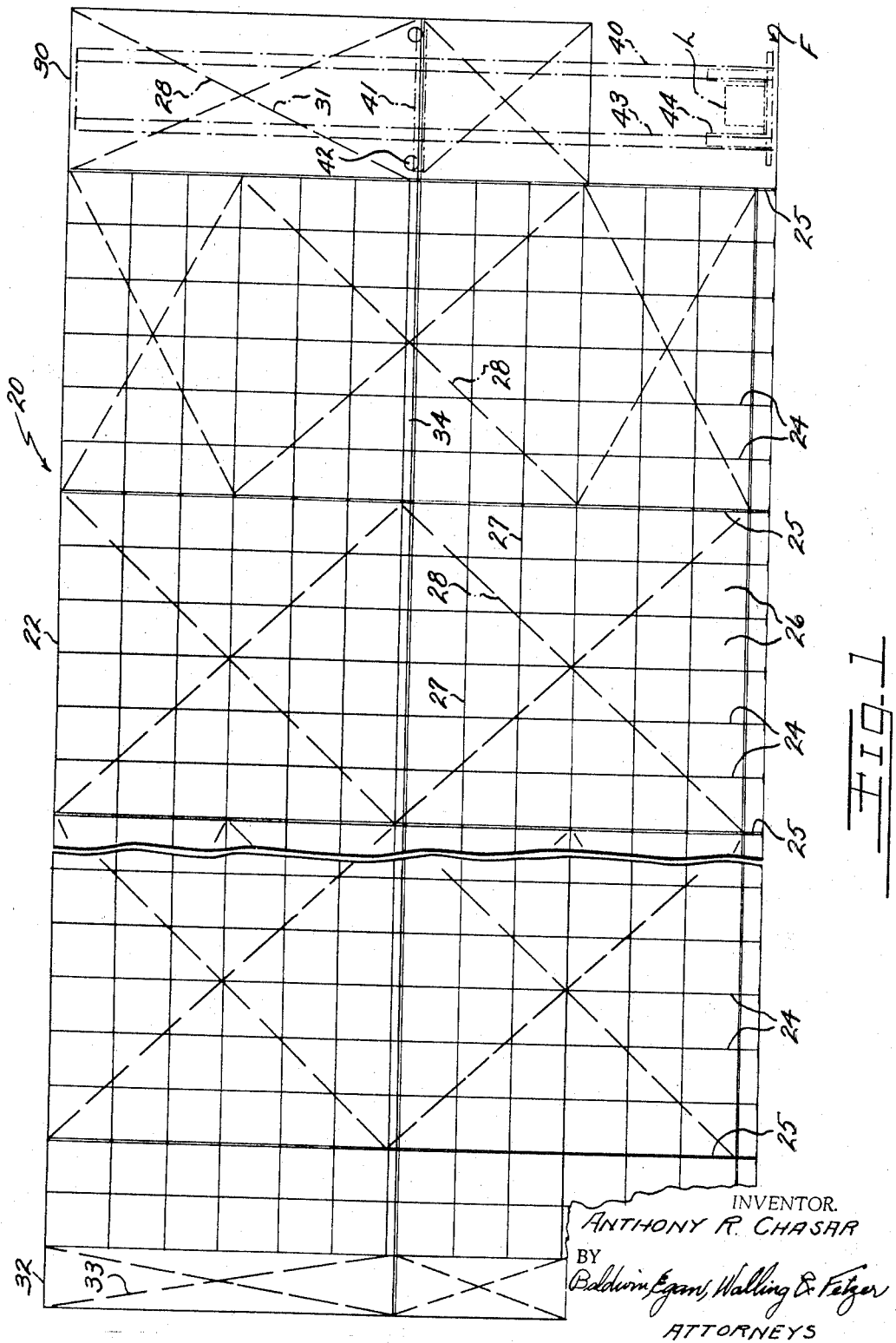

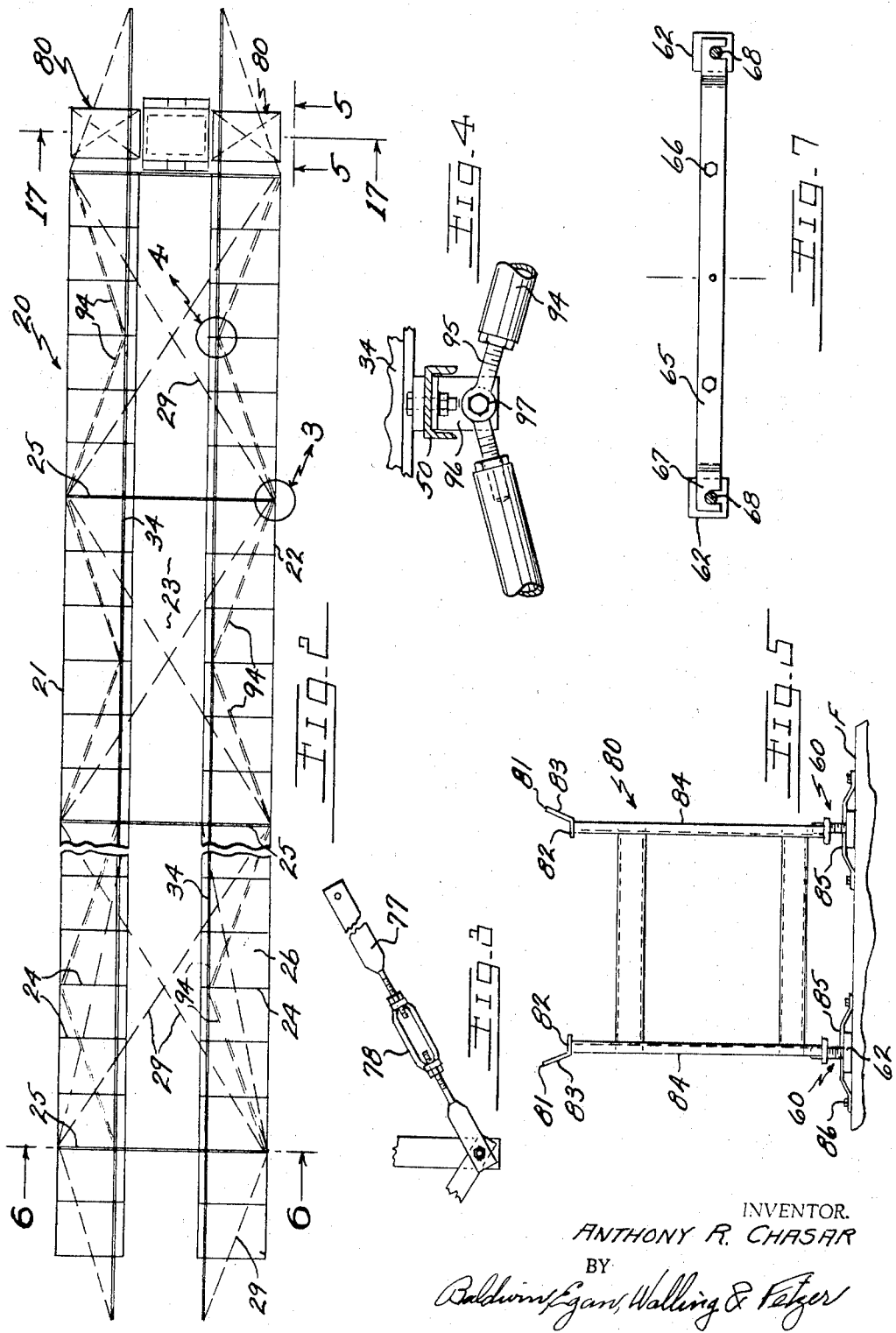

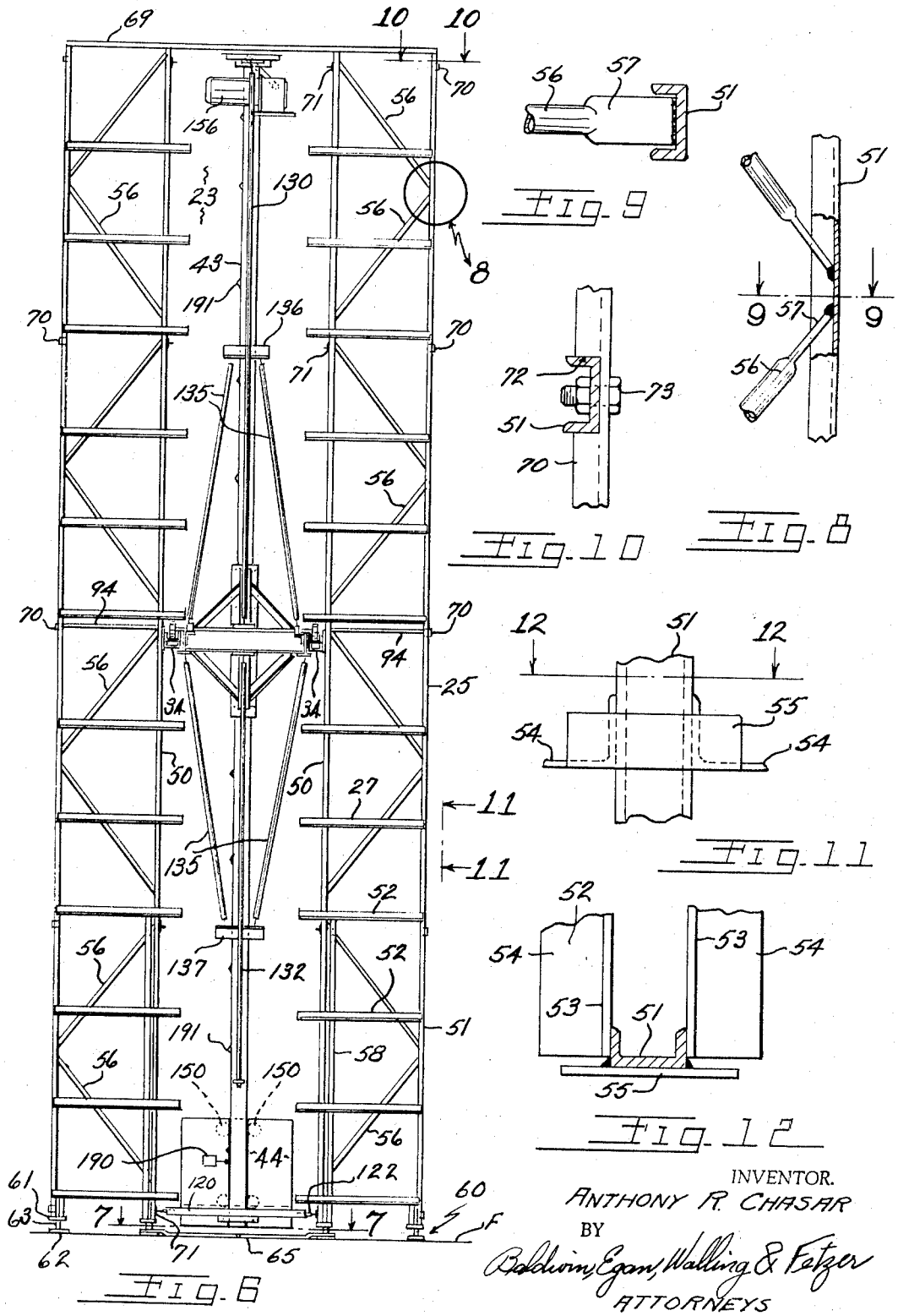

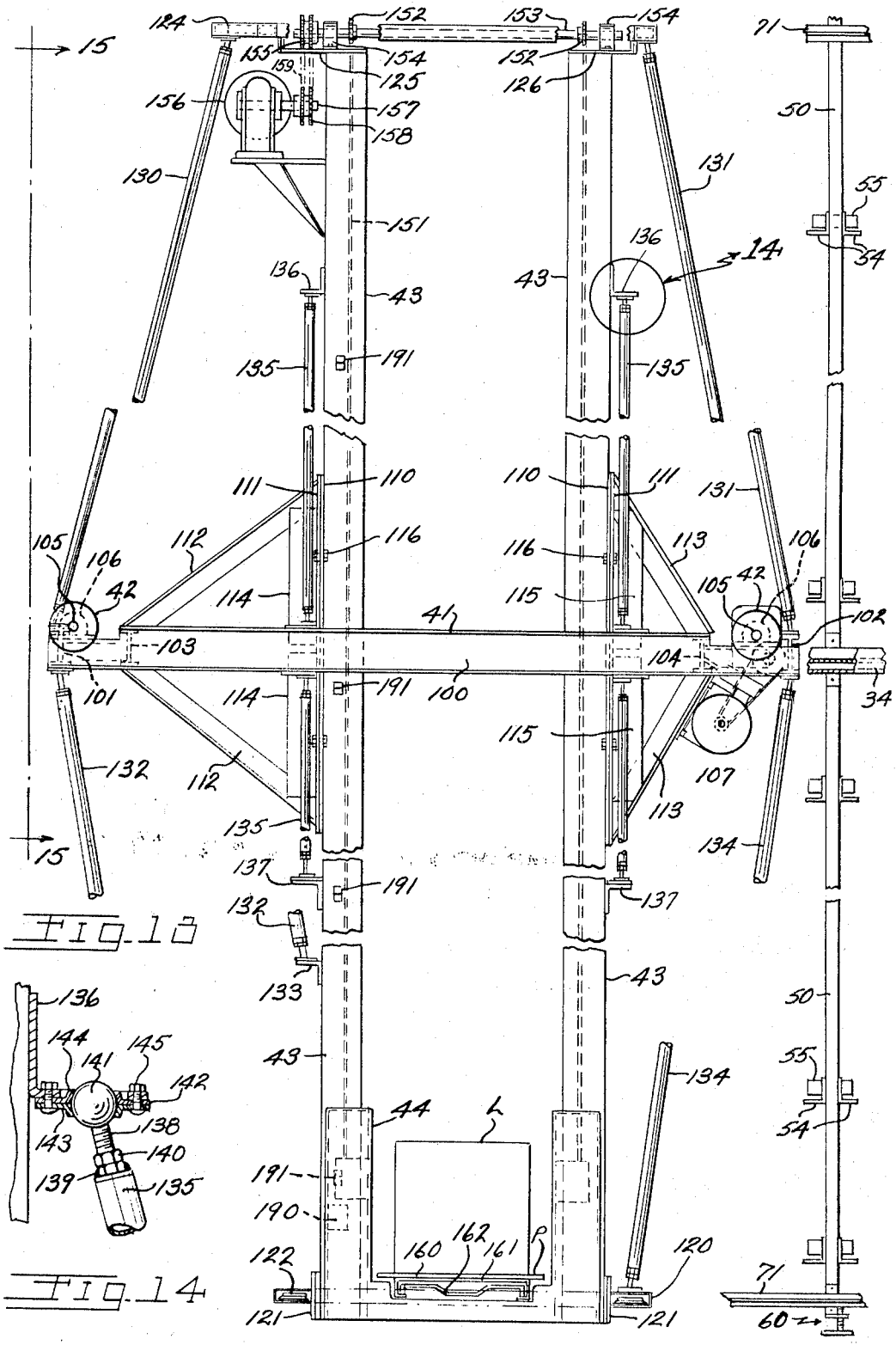

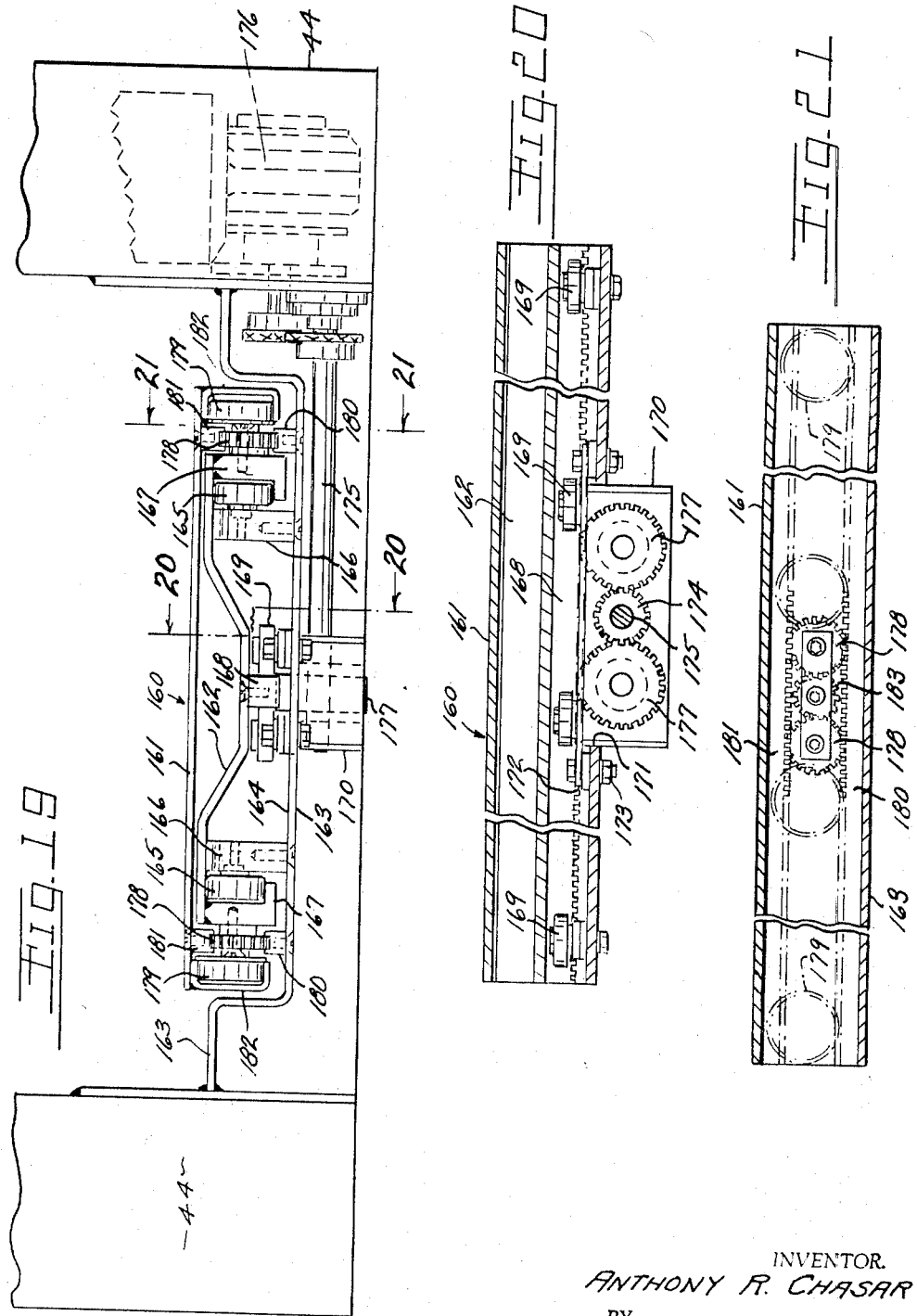

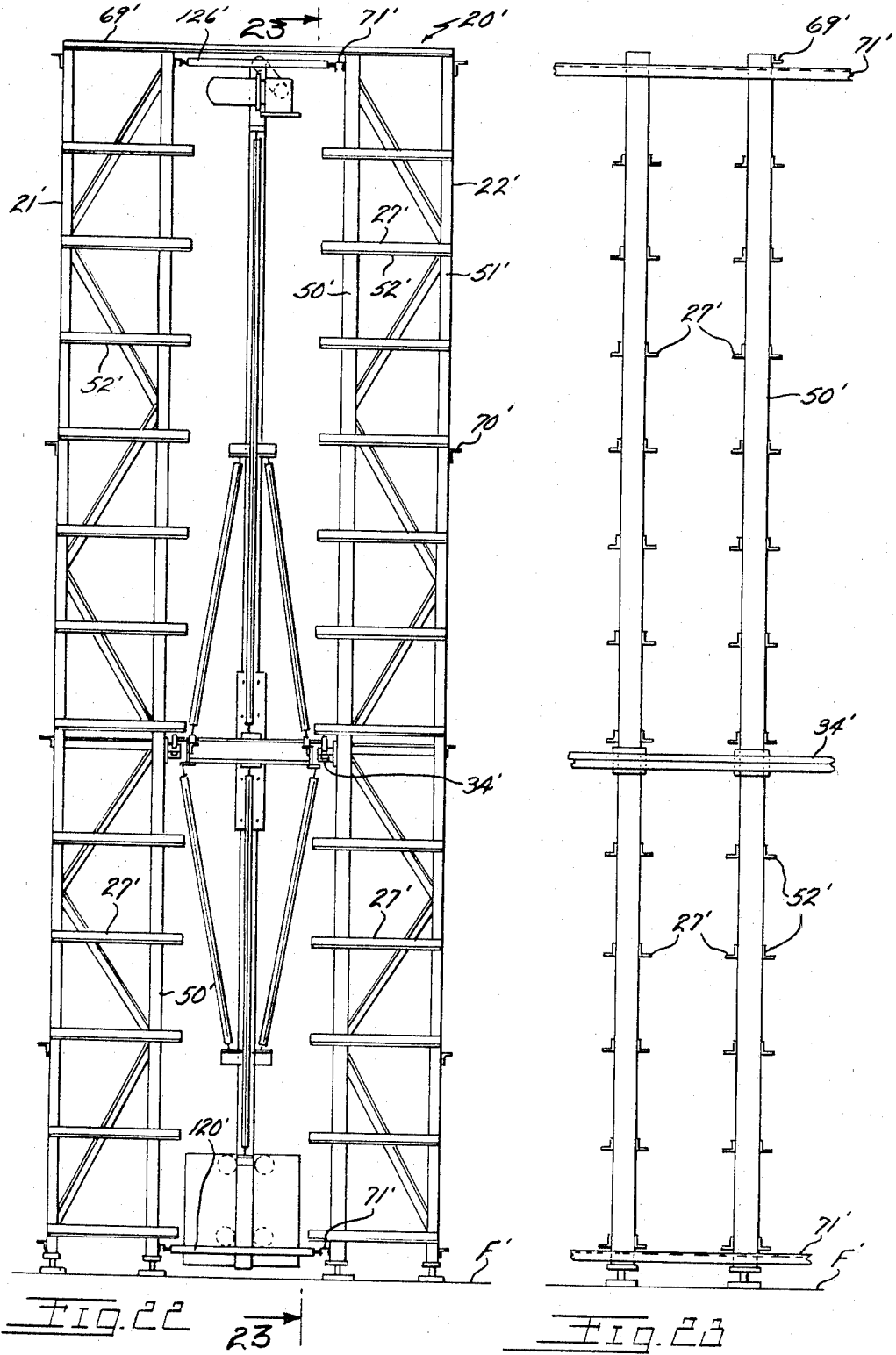

3,432,056
LATERALLY MOVABLE EXTRACTOR MECHANISM
Anthony R. Chasar, Columbiana, Ohio, assignor to The Triax Company, Cleveland, Ohio, a corporation of Ohio
Original application Sept. 3, 1965, Ser. No. 484,845, now Patent No. 3,371,804, dated Mar. 5, 1968. Divided and this application Mar. 1, 1968, Ser. No. 709,765
U.S. Cl. 214—730                                                1 Claim
Int. Cl. B66f 9/14

ABSTRACT OF THE DISCLOSURE

The extractor comprises a first rectilinearly reciprocal power driven member or rail mounted on the elevator, which serves as a housing for the extractor, and a second rectilinearly reciprocal load carrying member or rail driven by the first member for movement parallel to that of the first member. The first member carries spaced gears thereon which move bodily with the first member, with the gears meshing with upper and lower racks on the elevator and on the second member respectively in the retracted condition of the members. Upon rotation of the gears due to drive movement of the first member, the second load carrying member is driven out ahead of the first member and the spaced gears permit movement of the second member outwardly a greater distance to extended position, while still maintaining meshing relation of the rack on the second member with one of the gears while the other gear maintains meshing relation with the rack on the elevator.

---

This is a division of copending U.S. patent application Ser. No. 484,845, filed Sept. 3, 1965, and issued on Mar. 5, 1968, as U.S. Patent 3,471,804 which in turn is a continuation-in-part of application Ser. No. 373,803, filed June 9, 1964, now abandoned for Automatic Warehousing System.

This invention relates to automatic warehousing systems of the type having a storage frame comprising vertically and horizontally arranged load support means and a mechanized carrier movable horizontally and vertically alongside the support means for selectively transporting a load to or picking up a load from any one of said support means.

The warehousing system herein disclosed comprises, generally, a lightweight but strong skeletal storage frame comprising the aforesaid load support means disposed in vertical and horizontal rows on either side of an aisle. A mechanized carrier supported by horizontal tracks disposed intermediate the top and bottom of the storage frame is movable vertically and horizontally in the aisle. The load support means comprise pairs of elongated, spaced ledge members, disposed transverse to the aisle, across which a load is bridged for storing. The carrier has a laterally movable, cantilever extractor which transfers a load laterally between the aisle and a load support means either by entering the load storage space slightly below a selected pair of ledge members and then moving upwardly to lift the load off of the ledge members and return it into the aisle or by moving a load into the storage space slightly above a selected pair of ledge members and then moving downwardly to deposit the load across the ledge members. The carrier has vertical track means projecting above and below the horizontal tracks and carrying an elevator which is movable vertically along the vertical track means to the different levels of the load support means. The laterally movable extractor is carried by the elevator and is movable transversely of the aisle to cantilever outwardly into the storage space on either side of the aisle.

An important object of the invention is to provide a warehousing system comprising a skeletal type storage frame having rows of vertical posts arranged along both sides of an aisle and defining storage bays between the posts, there being means for connecting said posts together along said aisle adjacent to both the tops and bottoms of said posts and a horizontal track carried by each row of posts on either side of said aisle, each said track rigidly connecting all of the posts in a row, intermediate the top and bottom of said storage frame.

Still another object is to provide means whereby said tracks captively receive wheels of the carriage in such manner as to effectively tie portions of the storage frame together across the aisle wherever said carriage is located and cause any force exerted on said carrier laterally of said aisle to be transmitted to the entire storage frame.

A further object of the invention is to provide a horizontally movable carriage bridged across the aisle and running on horizontal tracks carried by the storage frame intermediate the top and bottom thereof on either side of the aisle, the vertical track means being carried by said carriage and said carriage comprising an open, rectangular frame for the elevator to pass through.

Another object is to provide a vertical track means which comprises a pair of vertically disposed, parallel tracks which are spaced from each other in the horizontal direction of the aisle, said elevator movable along and between said vertical tracks, and there being a horizontally disposed tie means at the bottom of said vertical tracks which affords an opening through which the elevator can be lowered all the way to the floor.

Still another object is to provide the carriage with parallel, horizontally disposed side members disposed adjacent to the horizontal tracks, said side members having upper and lower flanges and said horizontal tracks being disposed at least partially between said flanges.

Still another object is to provide, in such a warehousing system, upwardly open, channel-shape horizontal tracks with said carriage being provided with axially vertical rollers disposed within at least one channel-shape track for guiding the carriage and the vertical tracks in a straight, horizontal path along said aisle.

A further object is to provide a storage frame comprising a plurality of parallel ladders, some of said ladders being trusses tied together across the top and the bottom of the aisle, and there being horizontally disposed truss means on either side of the aisle at the level of the horizontal tracks.

Yet another object is to provide, in such a warehousing system, intermediately disposed horizontal tracks connected to the storage frame at each ladder to maintain the proper spacing between each adjacent pair of ladders.

Still another object is to provide intermediately disposed horizontal tracks which extend beyond one end of the storage frame whereby the carriage and vertical tracks can move out of the aisle into and above a work area which is disposed beneath said horizontal tracks.

A still further object is to provide transverse load support means in the storage space on either side of the aisle which comprise angle-shape members each having one flange disposed horizontally for supporting one edge of a load and one flange projecting vertically upwardly to provide a side guide for the load.

Another object is to provide a load storage system of the general type referred to wherein the vertical tracks are free standing above the carriage and wherein their lower ends are provided with wheel guide means which rollingly engage the edges of stringers carried adjacent to the bottom of the aisle and stabilize said vertical tracks.

Yet another object is to provide the vertical tracks with transverse guide means at the top, bottom and intermediate levels thereof.

Another object is to provide each ladder with an aisle post adjacent to said aisle as well as an outer post disposed away from said aisle with the elongated support members projecting outwardly into the aisle substantially beyond said aisle posts, there being secondary post means adjacent to the lower end portions of said aisle posts which supplement and reinforce said aisle posts.

Other objects of the invention will be readily understood from the following description of two embodiments of the invention, said embodiments being illustrated in the accompanying drawings, in which:

FIG. 1 is a schematic, side elevation of a first embodiment of the automatic warehousing system of this invention;

FIG. 2 is a schematic, top plan view of the automatic warehousing system shown in FIG. 1;

FIG. 3 is an enlarged detail of a connection indicated at the circle 3 in FIG. 2;

FIG. 4 is an enlarged view of a connection indicated at the circle 4 in FIG. 2;

FIG. 5 is a side elevation of a pick-up and delivery station as seen from the line 5—5 of FIG. 2;

FIG. 6 is a view taken along the line 6—6 of FIG. 2 showing the carrier disposed within the aisle of the storage frame;

FIG. 7 is a section taken along the line 7—7 of FIG. 6;

FIG. 8 is an enlarged view in partial section of the connection indicated by the circle 8 in FIG. 6;

FIG. 9 is a view taken along the line 9—9 of FIG. 8;

FIG. 10 is an enlarged view taken along the line 10—10 of FIG. 6;

FIG. 11 is an enlarged elevation as seen from the line 11—11 of FIG. 6;

FIG. 12 is a view taken along the line 12—12 of FIG. 11;

FIG. 13 is an enlarged side view of the carrier partially cut away;

FIG. 14 is an enlarged view of the connection indicated by the circle 14 in FIG. 13, shown partially in section;

FIG. 19 is an enlarged view of the extractor as shown at the bottom of FIG. 13;

FIG. 20 is a section taken along the line 20—20 of FIG. 19;

FIG. 21 is a section taken along the line 21—21 of FIG. 19;

FIG. 22 is a view similar to FIG. 6 showing a modified carrier disposed within the aisle of a modified storage frame; and FIG. 23 is a section taken along the line 23—23 of FIG. 22.

Figure 15:
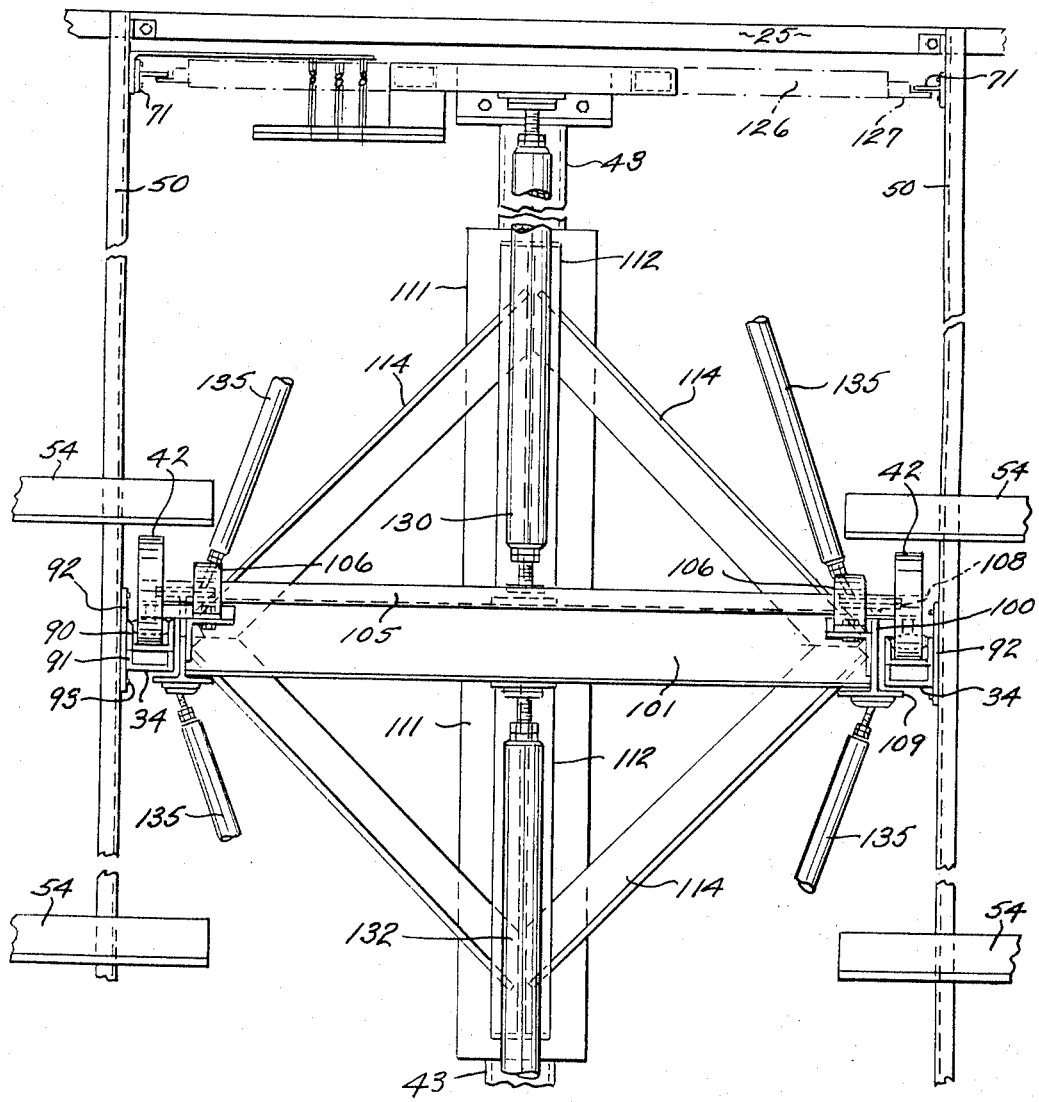
FIG. 15 is an enlarged end view of a portion of the carrier taken from the line 15—15 of FIG. 13.

Referring now particularly to FIGS. 1 and 2 of the drawings, the automatic warehousing system of this invention comprises a storage frame generally indicated at 20 having parallel storage frame sections 21 and 22 defining between them an aisle 23. Each storage frame section comprises a multiplicity of vertically disposed ladders 24 and 25 which are disposed in planes transverse to the aisle and define between them a multiplicity of open bays 26. Load support means 27 are disposed at different levels in the bays 26, said load support means being shown schematically in FIG. 1 and being herein later described more fully in detail.

The outer sides and top of the storage frame 20 are provided with diagonal bracing 28 (FIG. 1) and diagonal bracing 29 (FIG. 2) respectively by means of which said storage frame is squared. Supplemental framework 30, having diagonal bracing 31, projects beyond the right-hand end of the storage frame as seen in FIG. 1, the bottom of said supplemental framework being disposed a substantial distance above a work space on a floor F upon which the entire warehousing system is built. Supplemental framework 32 having a diagonal bracing 33 similarly projects beyond the left-hand end of said storage frame as seen in FIG. 1.

Tracks for supporting a load carrier are provided on the aisle side of each setion 21 and 22 substantially midway between the top and the bottom of the storage frame 20. A load carrier, generally indicated at 40, has an intermediate carriage 41 attached thereto, said carriage generally bridging the distance across the aisle 23 and having wheels 42 at the sides thereof which are disposed on and rollingly engage the tracks 34. Said load carrier has two vertically disposed, parallel tracks 43 which are rigid with the carriage 41 and which support a vertically movable elevator 44. Said elevator is movable along the tracks 43 the full height of the storage frame 20. The horizontal tracks 34 extend beyond the ends of the storage frame into the supplemental framework 30 whereby the entire carrier can be moved beyond the storage frame proper into the work space. The horizontal tracks 34 also extend out into the smaller supplemental framework 32 thereby accommodating the left-hand end of the carriage 41 when the load carrier 40 is servicing the extreme left-hand bay 26. It will be readily seen that by means of the carriage 41, the load carrier can be moved to any one of the bays 26, and by means of the elevator 44, a load, indicated at L in FIG. 1, can be moved to the level of any load support means 27.

The storage frame and carrier of this invention are of lightweight, inexpensive, skeletal construction and are preferably made primarily from relatively thin, elongated steel construction members which may be of various conventional cross sections such as rectangular, channel-shaped, angular, tubular and the like. The substantial length of the construction members and their inherent resilience make it necessary that special attention be given to squaring the storage frame holding it square. The load carrier is preferably power operated under automatic controls, details of which are not herein disclosed, whereby alignment of the carrier with the storage frame sections and the maintaining of adequate clearances and tolerances is of utmost importance.

A lightweight but strong storage frame which has proved to be unusually rigid and adaptable for an automatic warehousing system of the type comprising the present invention is illustrated in detail in FIGS. 3–12. As shown in FIG. 6, each ladder 24 or 25 comprises a pair of posts, an aisle post 50 and an outer post 51 which is disposed transversely outwardly from the aisle 23. The posts 50 and 51, as herein illustrated, are channel-shape in section and are connected by pairs of horizontally disposed, angle-shape ledge members 52. As detailed in FIGS. 11 and 12, the posts 50 and 51 are sandwiched between a pair of the ledge members 52 at spaced intervals throughout the height of each ladder, each said ledge member having a vertically disposed flange 53 welded to the adjacent posts and a horizontally disposed flange 54 projecting in the direction of the adjacent ladder 24 or 25. The horizontal flanges project into the bays 26 in coplanar pairs thereby providing a pair of complementary ledges across which a load is bridged for storage. Each such pair of complementary flanges 54 comprises one of the aforementioned load support means 27. A stop plate 55 is secured flatwise against each outer post 51 at the level of the ledge members 52. Said stop plate, like the ledge members themselves, may be welded or otherwise suitably secured in place with its ends overlapping the ends of said ledge members. The top plate 55 serves as a stop or limiting means for a load bridged across an adjacent pair of complementary flanges 54 by abutting said load.

As well shown in FIGS 1 and 2, the ladders 25 are fewer in number than the ladders 24, said ladders 25, in the form of the invention herein illustrated, being spaced six bays apart with five of the ladders 24 being interposed between two adjacent ladders 25. All of the ladders have the same basic construction but the ladders 25 constitute trusses and will be hereinafter referred to as truss ladders. FIGS. 6, 8 and 9 show a truss ladder 25 in detail wherein the posts 50 and 51 comprise the chords of the truss and are connected by diagonal braces 56. The channel-shape posts 50 and 51 are oriented with their open sides directed toward each other whereby each diagonal brace 56 has its end nesting within said posts. As herein illustrated, the braces 56 are of tubular construction having flattened ends 57 which are welded to the posts as illustrated in detail in FIGS. 8 and 9.

It will be noted that the angle-shape ledge members 52 which afford the load support means 27 project inwardly toward the aisle 23 beyond the aisle posts 50 a substantial distance. The result is that a load carried at any load support means is supported to a greater extent by the aisle posts than by the outer posts 51. This means that the lower end portions of the aisle posts 50 are necessarily under great stress when the uppermost load support means are substantially fully loaded. To reinforce the lower end portion of the aisle posts 50 and to afford the structural effect of an upwardly tapered column at each said aisle post, there is provided a supplemental post 58 disposed just outwardly from each post 50 parallel therewith and closely adjacent thereto. Each supplemental post 58, as herein illustrated, extends upwardly and is connected to the first four levels of the load support means 27, said supplemental post being disposed between the ledge members 52 and connected to the adjacent aisle posts and welded to said ledge members in the same manner as said adjacent aisle posts.

The lowermost ends of all of the aisle posts 50 and 51 are provided with vertical adjustment means generally shown at 60 and comprising, in the present instance, a horizontally disposed, tapped plate 61, which is welded or otherwise suitably secured to the lower end of each post, and a foot member 62 having an upwardly directed, threaded shank 63 fitted within the tapped plate 61. It will be readily undersood that slight leveling adjustments of the storage frame can be made individually at each post by rotating the foot member 62 to either effectively lengthen or shorten the associated post.

In a structure of the type herein disclosed, it is important that the width of the aisle 23 be maintained uniform throughout the length and height of said aisle. To effect this, at least the truss ladders 25 are connected across the bottom and the top of the aisle by transverse members which maintain the width of the aisle uniform. An exemplary bottom spacing means is shown in FIG. 6 and detailed in FIG. 7 and comprises a flat metal bar or strap 65 which is secured flatwise to the floor F in any suitable manner such as by bolts or screws 66. Each bar or strap 65 is disposed transversely to the longitudinal direction of the aisle and has upwardly stepped end portions 67 which overlap the foot members 62 of transversely opposite aisle posts 50 of a transversely opposite pair of truss ladders 25. The end portions 67 are provided with notches 68 which open in a direction parallel with the aisle whereby said end portions can hook or nest around the adjacent shanks 63 of said foot members. By means of the straps 65, the lower ends of the truss ladders 25 are positively and uniformly spaced across the aisle 23. If desired, the aisle posts of aligned truss ladders may be separately fastened down by straps of the type shown at 85 in FIG. 5, which said straps 85 will be hereinlater described. The separate straps 85 provide a clear aisle which is quite easy to clean.

The upper ends of each transversely disposed pair of truss ladders are connected by a steel cross member 69 which is bolted or otherwise suitably secured to all of the posts 50 and 51 of said transverse pair of truss ladders. Thus the spacing at the top of the aisle between the truss ladders is also rigidly maintained.

The plain ladders 24 are aligned with the truss ladders 25 and are maintained in uniform spaced relation along the aisle to form the bays 26 by suitable outer stringers 70 connecting all of the outer posts 51 at each outer side of the storage frame 20, and inner stringers 71 connecting all of the aisle posts 50 in the direction of the aisle on either side of said aisle. The inner stringers 71, as illustrated in FIGS. 6, 14, and 15, are T-shape in cross section with the stems of the T-sections projecting horizontally in the direction of said aisle. The outer stringers 70 as herein illustrated are channel-shape with the open sides of the channels being directed inwardly of the storage frame toward the aisle and with the flanges thereof being notched out as indicated at 72 (FIG. 10) to nest over the vertical outer posts 51. The outer stringers are secured to the outer posts 51 in any suitable manner such as by nut and bolt assemblies 73, and it will be noted that the notches in the stringer flanges nested around the vertical posts resist rotation of the two members about the axis of the nut and bolt assemblies 73. The inner stringers 71 are preferably connected to the aisle posts 51 in a manner to prevent rotation between said stringer and the aisle post at each connection point. This may be done by welding the inner stringers in place after the aisle posts' spacing has been determined or by bolting the same with two bolts at each point of connection, one above and one below the horizontally disposed stem of the T-section.

The multiplicity of rigid, non-rotatable connections at the outside of the storage frame at the stringers 70 and at the inside of the storage frame at the stringers 71 effect an extremely rigid structure which will tend to maintain the uniform spacing, clearances, and squareness necessary for effective automatic operation.

As hereinbefore mentioned, the outer sides and the top of the entire storage frame 20 are also braced by diagonal bracing 28 and 29 (FIGS. 1 and 2). The diagonal bracing 28 and 29 preferably comprises flat metal straps 77 and turnbuckle connections 78 as detailed in FIG. 3. The turnbuckle connections 78 allow adjustment of and squaring of the entire storage frame after its erection. It will be noted, for example, that the diagonal bracing 28 and 29 is connected primarily between the truss ladders 25, it being understood that with the present construction, if the truss ladders are properly positioned, the interposed plain ladders 24 will automatically be brought to their proper positions. Thus the truss ladders, with their transverse connections across the top and bottom of the aisle, afford key structural units which when properly positioned automatically pull the remainder of the storage frame into position. It will also be noted that the diagonal bracing 28 and 29 extends to the supplemental framework 30 and 32 whereby it is also aligned and maintained in alignment with the remainder of the storage frame.

A warehousing system of the type herein disclosed and illustrated is preferably provided with an initial starting or pick-up and delivery station which is hereinafter referred to simply as a P and D station. Such a P and D station may be located on either side of the aisle at any suitable height relative to the storage frame and constitutes a terminal point from which a load initially starts in an automatic cycle for storage within the storage frame or to which it is returned if it is being unstored from said storage frame. The present embodiment of the invention shows two P and D stations 80 in FIG. 2 which said stations are more fully detailed in the enlarged view of FIG. 5. Each P and D station in the present instance is located adjacent to the ground level, but it will be understood that the vertical height of the P and D station is not critical. A typical P and D station 80 comprises a pair of angle supports 81 which are elongated members of substantially the same length as the ledge members 52 and which are positioned in spaced, parallel relation transverse to the aisle in the same manner as said ledge members. The angle supports 81 have horizontal flanges 82, across which a load is bridged in use, and upwardly and obliquely outwardly angled flanges 83 which when taken together are downwardly convergent thereby tending to straighten and center a load which is initially deposited across said angle supports. The angle supports 81 are supported at either end by relatively short, upright posts 84, the lower ends of said posts carrying adjustment means 70 of the type described in connection with FIG. 6. Each P and D station 80 may be secured to the floor F in any suitable manner such as by straps 85 which pass over each foot member 62 and are secured to the floor by bolts or screws 86.

The tracks 34 are well shown in FIG. 15, each track comprising an upper channel member 90 and a lower channel member 91. Both channel members are disposed with their flanges directed upwardly, the flanges of the lower channel member 91 abutting and being welded to said upper channel member thereby providing a box beam beneath said track to give it rigidity. The lower channel member 91 serves to stiffen and reinforce the upper channel member 90 which said upper channel member receives the wheels 42 of the carriage 41. At each aisle post 50, each track 34 is provided with a mounting plate 94 which is welded or otherwise suitably secured flatwise against the outer flanges of the channel members 90 and 91. Each mounting plate 92 extends above and below the associated track 34 and is suitably secured above and below said track to the adjacent aisle post 50 in any suitable manner such as by bolts 93. The tracks 34, disposed on either side of the aisle 23 intermediate the top and bottom of the storage frame, constitute the most rigid portions of said storage frame and serve to give squareness and rigidity to the work faces of the storage frame where loads are inserted.

Horizontally outwardly and opposite to the tracks 34, the storage frame 20 is provided with outer stringers 70. As shown in FIGS. 2 and 6, diagonal braces 94 connect the horizontal tracks 34 with these outwardly opposite stringers 70. The diagonal braces 94 are preferably tubular in construction and are connected diagonally across at least three bays with their ends being disposed alternately adjacent to an aisle post or an outer post. As herein illustrated, said braces 94 are provided throughout the length of the storage frame, but it will be readily understood that one or more of said braces may be omitted depending upon the size of the storage frame, the loads to be stored, and similar variables. As detailed in FIG. 4, one end of each diagonal brace 94 carries an eye bolt and nut assembly 95 for longitudinal adjustment of the associated diagonal brace. The post to which it is connected carries a bracket 96 to which each eye bolt is secured by a nut and bolt assembly shown at 97. As distinguished from the turnbuckle arrangement of FIG. 3, the adjustment means in FIG. 4 is adjusted before the diagonal brace 94 is attached by the nut and bolt assembly 97. Thus, external means are used to pull the frame into shape as needed in a horizontal plane and then the eye bolt and nut assembly is adjusted whereby subsequent attachment to the brackets 96 holds the frame square in a horizontal plane at the intermediate level.

From the foregoing description, it will be readily understood that each horizontal tack 34 provides an inner chord of a horizontally disposed truss and that each associated outer stringer 70 provides the outer chord of the horizontal truss. This provides trusses in a horizontal plane throughout the length of each section 21 or 22 of the storage frame 20 at an intermediate level which said trusses intersect and are connected to the vertical truss ladders 25 hereinabove described. The truss ladders are, in turn, rigidly connected together in pairs across the top and bottom of the storage frame, additional rigidity being afforded by the top diagonal, adjustable bracing 29. These horizontal and vertical trusses, including therewith the horizontal tracks 34, constitute the basic structural support, strength, and aligning means of the storage frame 20. It is from this trussed, intermediate portion of said storage frame that the entire carrier and load transferring mechanism is supported.

Referring now particularly to FIGS. 13 and 15, the vertical tracks 43 are disposed in the middle of the aisle 23 and are spaced from each other in the horizontal direction of said aisle. Said vertical tracks are carried by the carriage 41 to move therewith along the aisle 23. Said carriage comprises a rectangular frame having side members 100 made of I-beams connected across their ends by end members 101 and 102. Spaced inwardly of the frame of the carriage 41 adjacent to said end members 101 and 102 are cross supports 103 and 104 respectively. The side members 101 are stepped downwardly at their ends outwardly beyond the cross supports 103 and 104 at which point the wheels 42 are mounted on axle shafts 105 journaled in pillow blocks 106. The wheels and axle shaft adjacent to the end member 102 are connected to motor and gear drive means generally indicated at 107 whereby the carriage is moved along the tracks 34 in use. It will be noted that the side members 100 have upper and lower, outwardly horizontally projecting flanges 108 and 109 which are disposed respectively above and below the adjacent track 34. This arrangement saves space by nesting the tracks into the carriage and also provides a safety feature whereby, should one of the axle shafts break, the upper flange 108 will drop down upon the track 34 and prevent the carrier from falling further.

The vertical tracks 43 project through the rectangle formed by the side members 100 and the cross supports 103 and 104 and are spaced inwardly from said cross supports, said tracks being disposed closer to the cross support 104 than to the cross support 105. Each vertical track carries a heavy, vertically elongated mounting plate 110 which is welded or otherwise suitably secured to the associated track and which extends above and below the carriage 41 a substantial distance. A similar mounting plate 111 is carried by diagonal bracing members at either end of the carriage 41. Diagonal struts 112 (FIG. 13) extend from the cross support 103 upwardly and downwardly to the ends of the mounting plate 111. Similarly, diagonal struts 113 extend upwardly and downwardly from the cross support 104 to the upper and lower ends of the other mounting plate 111. Laterally directed diagonal supports 114 extend from either side member 100 upwardly and downwardly to meet the divergent ends of the diagonal struts 112, and laterally directed diagonal struts 115 similarly connect said side members to the divergent ends of diagonal struts 113. All of the struts 112–115 and their associated mounting plates 111, form a rigid weldment whereby when said mounting plates 111 are bolted to the mounting plates 110 by bolt and nut assemblies 116, the vertical tracks 43 are rigidly carried with the carriage 41.

Figure 16:
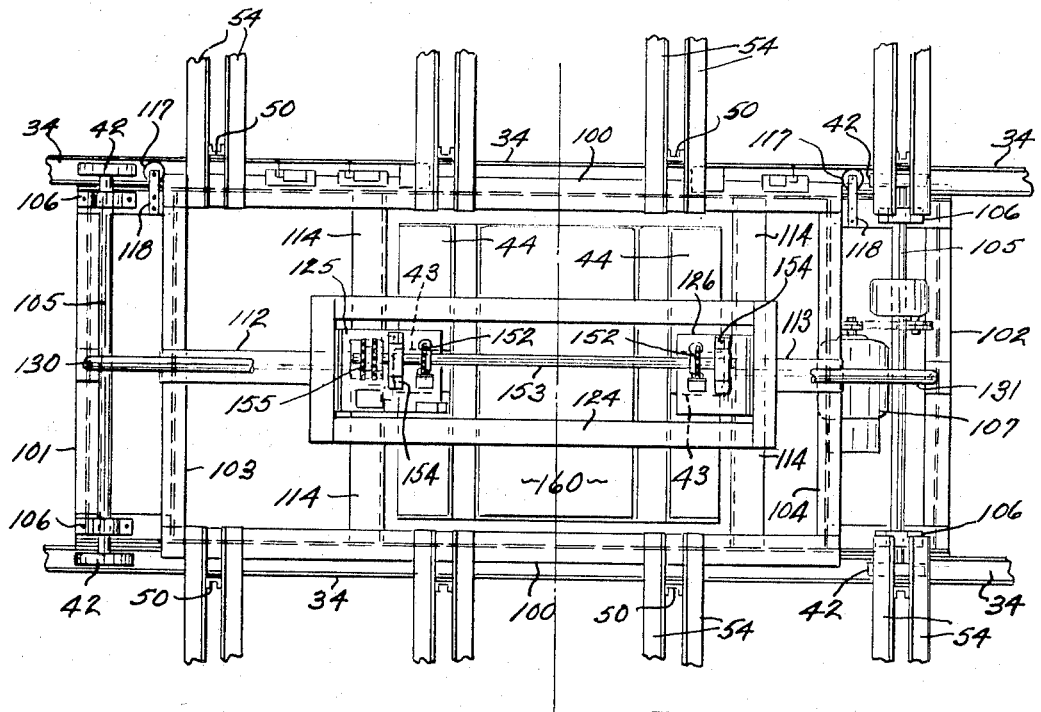
FIG. 16 is a top plan view of the carrier.

The carriage frame is stabilized with respect to the horizontal tracks 34 by stabilizing rollers 117 (FIG. 16). Said stabilizing rollers are carried at the ends of arms 118 which are, in turn, carried by one of the side members 100. The arms 118 project transversely of the aisle 23 out over the adjacent horizontal track 34, and the rollers 117 project downwardly into said adjacent track on vertical axes. Said rollers closely but movably interfit said horizontal track and are mounted on widely spaced axes whereby the carriage 41 is stabilized with respect to said horizontal tracks. This, in turn, stabilizes the vertical tracks 43 and prevents their spiraling or twisting about a vertical axis.

The lowermost ends of the vertical tracks 43 are connected by a rectangular frame 120 which surrounds the lower ends of said vertical tracks and is connected thereto by any suitable means such as brackets 121. The frame 120 is disposed slightly above the lowermost ends of the vertical tracks 43 and carries preferably flanged rollers 122 at the lateral sides thereof either side of the aisle 23. As shown in FIG. 6, the frame 120 is sufficiently wide for the rollers 122 to engage the lowermost inner stringers 71 on either side of the aisle, and the vertical tracks 43 are both rigidly connected together and stabilized at their lower ends by said rectangular frame 120. As shown in the top view of FIG. 16, the upper ends of the vertical tracks 43 are similarly connected together and stiffened by a narrower rectangular frame 124 which is connected to the upper ends of said tracks by any suitable means such as brackets or supports 125 and 126 (FIG. 13). Thus the vertical tracks 43 are effectively stiffened at both ends as well as in the middle or intermediate portions thereof.

In the form of the invention herein described and illustrated, the upper ends of the vertical tracks 43 are free standing, the stabilizing rollers being provided only at the bottoms of said tracks. However, as shown in broken line at the top of FIG. 15, an upper rectangular frame 126, similar in size to the lower frame 120 and having flanged rollers 127 for engagement with the uppermost longitudinal stringers 71, may be provided if the height of the structure and the weights of the loads to be carried by the carrier are sufficient to warrant extra stabilizing means at the top as well as the bottom of the vertical tracks.

The extreme length which the vertical tracks 43 have in some applications of the invention may tend to cause a pendulum action of said tracks in the direction of the aisle which action takes place when the carrier is stopped or started and the elevator 44 with the load thereon is located at one extreme end of said tracks. This pendulum action is partially offset by the substantial distance which is provided between the axle shafts 105 and the wheels 42 associated therewith. Further means are provided to counteract the pendulum action in the form of elongated braces 130 and 131. Brace 130 extends diagonally upwardly from the center of end member 101 to the upper rectangular frame 124 whereas the brace 131 similarly extends upwardly from the end member 102 to said rectangular frame 124. As seen in FIG. 6, the braces 130 and 131 are aligned with the vertical tracks 43 along the direction of the aisle 23. A similar brace 132 extends downwardly from the end member 101 to a bracket 133 carried by the adjacent vertical track 43 a substantial distance above the lowermost end of said adjacent track. Still another brace 134 similarly extends downwardly from the end member 102 to the top of the lower rectangular frame 120. It will be readily seen that these braces 130, 131, 132 and 134 will effectively offset pendulum action in the direction of the aisle 23.

Since the loads carried by the elevator 44 are transferred laterally outwardly from the aisle into the storage space in cantilever fashion, it is desirable to afford additional lateral bracing to prevent bowing of long, unsupported lengths of the vertical tracks 43. This support comprises a plurality of diagonal braces 135 which extend upwardly and downwardly from the side members 100 adjacent to both vertical tracks to upper and lower brackets 136 and 137. The brackets 136 and 137 are carried by the tracks substantially halfway between their upper ends and said carriage and their lower ends and said carriage, respectively. The braces 135 eliminate long, unsupported lengths of the vertical tracks which might tend to flex or bow.

All of the braces 130, 131, 132, 134 and 135, as herein illustrated, are made of tubular steel and have an adjustable ball joint connection on at least one end as typically illustrated in the details of FIG. 14. In FIG. 14, the upper end of a brace 135 is provided with a threaded shaft 138 thread fitted into a fixed nut 139 carried by said brace and having a lock nut 140 disposed thereabove.

The upper end of the shaft or screw 138 carries a ball 141 which is captively carried in a socket means 142 mounted to a bracket 136. The socket means 142 comprises two plates 143 having annular flanges 144, the inner surfaces of said annular flanges defining a portion of a sphere whereby when said plates are positioned back to back around the ball 141, said ball is captively but rotatably held by the socket means. Said socket means is secured to the bracket 136 in any suitable manner such as by nut and bolt assemblies 145.

The elevator 44 is disposed between the vertical tracks 43 (FIG. 13) and is adapted for vertical movement along said vertical tracks in any suitable manner such as by rollers 150 (FIG. 6). Lifting means for the elevator comprises chains 151 (FIG. 13) which extend upwardly over sprockets 152 carried by a common shaft 153 disposed at the top of the vertical tracks 43. The shaft 153 is journaled in pillow blocks 154 disposed on top of the vertical tracks, one end of said shaft carrying driven sprockets 155. One of the vertical tracks 43 carries a motor and gear means 156 which is disposed generally adjacent to the driven sprockets 155. Said motor and gear means has a drive shaft 157 carrying drive sprockets 158, said drive sprockets being connected to the driven sprockets by chains 159. It will be readily understood that operation of the motor and gear means 156 in one direction will cause the elevator 44 to rise, and operation thereof in the opposite direction will cause said elevator to lower. It will also be noted that the elevator 44 can be lowered downwardly through the lower rectangular frame 120 all the way to the floor, the opening in said lower frame being large enough to accommodate said elevator.

Figure 17:
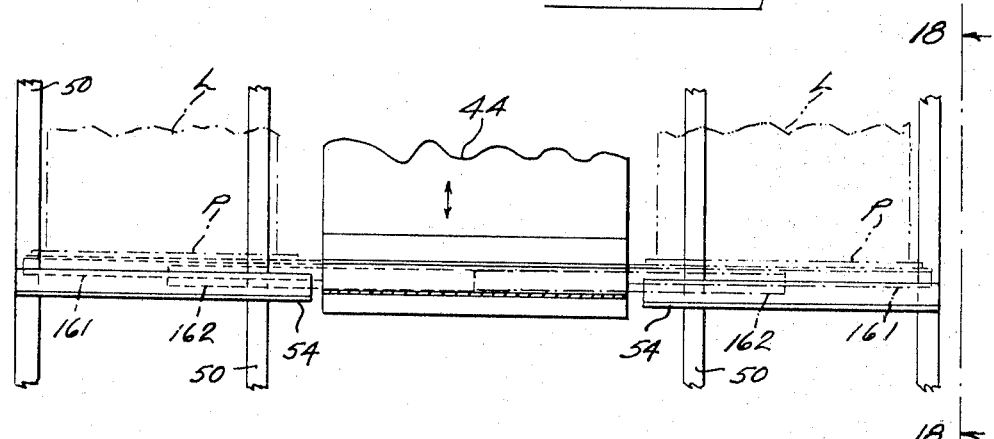
FIG. 17 is a schematic section through the carrier taken generally along the line 17—17 of FIG. 2 and illustrating the action of the extractor.

Referring now to FIGS. 19–21, the elevator 44 has a laterally movable extractor 160 which comprises an outer, upper frame or rail 161 and an inner, lower frame or rail 162. The inner frame 162 is adapted to be driven laterally out of the elevator 44 in either direction transverse to the aisle 23 with the outer frame 161 being driven outwardly ahead of said inner frame as illustrated schematically in FIG. 17.

The extractor 160 is carried generally within a recessed base 163 of the elevator 44, the recess in said base being shown at 164 and comprising a broad, U-shape channel disposed transversely of the aisle 23 and opening at either side of the elevator. Within the recess 164, said base carries axially horizontal rollers 165 mounted to said base by mounting blocks 166. The rollers 165 are arranged in parallel rows disposed substantially inwardly from the edges 164a of the recess 164 on the outer sides of said mounting blocks. The inner frame 162 extends over the rollers 165 and carries at its edges L-shape ways 167 which embrace the rollers 165 to afford rolling movement of said inner frame in either direction transversely of the aisle 23. The central portion of the inner frame 162 is depressed and carries on its lower side a rack 168 which is directed transversely of the aisle 23. A plurality of axially vertical rollers 169 carried by the base 163 are disposed in parallel rows on either side of the rack 168 to guide and stabilize said rack and the inner frame 162 as said rack and frame move transversely of the aisle. A gear housing 170 is mounted within a suitable aperture 171 in the base 163 and projects just below the center of the rack 168, said gear housing having mounting ears 172 secured to said base by nut and bolt assemblies 173.

The gear housing 170 houses a drive pinion 174 which is driven by a drive shaft 175 of a motor and transmission means indicated at 176. The motor and transmission means 176 is carried at one end of the elevator 44, and the drive shaft 175 and drive pinion 174 are disposed axially parallel with the aisle 23 substantially centrally of the recessed base 163.

The drive pinion 174 engages a pair of gears 177 which are disposed on either side of said pinion and which said gears are mounted in the gear housing 170 to mesh with the rack 168. The motor and transmission means 176 is reversible, and it will be readily understood that when the drive shaft 175 rotates, the inner frame 162 is driven transversely of the aisle out of the elevator 44 in one lateral direction through the drive pinion 174 and the pair of gears 177. As best seen in FIG. 20, it will be noted that the gears 177, being spaced transversely from the drive shaft 175, allow the rack 168 and the inner frame 162 to be displaced beyond the pinion 174 in either transverse direction without having said rack disengaged from its driving means. Thus, a greater movement is afforded to the inner frame 162 than would otherwise be possible if said inner frame were driven directly by the drive pinion 174 engaging the rack 168.

As best shown in FIG. 19, the L-shape ways 167 carry both idler pinions 178 and rollers 179. The idler pinions 178 engage racks 180 carried by the base 163, the upper peripheries of said pinions meshing with and supporting racks 181 mounted to the outer frame 161. The said outer frame carries U-shape channel members 182 which embrace the rollers 179 for rolling or sliding movement relative to the inner frame 162. As shown in FIG. 21, the idler pinions 178 are connected in a train with a smaller intermediate idler pinion 183 thereby affording increased transverse movement of the outer frame 161 by allowing greater movement of the racks 181 in either transverse direction without causing said racks to become completely disengaged from both of said idler pinions.

The extractor operates in the following manner. Motor and transmission means 176 drives the inner frame 162 substantially halfway or more out of the recessed base 163. This causes the idler pinions 178 to roll along the racks 180, such motion driving the outer frame 161 ahead of said inner frame by engagement of the idler pinions with the racks 181. Thus, if the inner frame 162 is driven halfway or more out of the recessed base 163, the outer frame 161 will be driven or extended all the way out of the elevator 44, as shown in the full line and dot-dash positions of FIG. 17, because it travels twice the distance of said inner frame.

Figure 18:
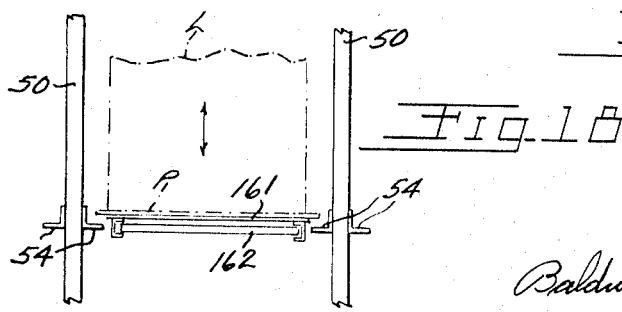
FIG. 18 is an elevation as seen from the line 18—18 of FIG. 17.

FIG. 18 demonstrates the manner in which a load is lifted from or deposited upon a load support means 27 comprising a pair of opposite ledge members 52. The outer and larger frame 161 is narrower in the direction of the aisle 23 than the distance between a pair of cooperant ledge members 52. Therefore, when said outer frame is moved laterally and cantilevered out of the aisle into the load storage area, said load carrying outer frame can pass freely in a vertical direction between the ledge members of any load support means. If the extractor is loaded, the outer frame 161 is moved laterally with its upper, load carrying surface disposed above the ledge means whereby subsequent lowering of the extractor through lowering of the elevator 44 deposits a load across the ledge means. To pick up a load, the outer frame 161 of the extractor is extended transversely into the storage area below a load at a load support means and the elevator is then raised to lift the load from said support means. Thus, it will be seen that the load carrying outer frame of the extractor can move completely into the storage area and freely vertically between the ledges of the load support means.

The general operation of the entire automatic warehousing system of this invention will be readily understood from the foregoing description. A load entering the system is first placed upon a P and D station 80 of the type illustrated in FIG. 5. Each load L is preferably carried upon a pallet P (FIG. 13) with all of the pallets being of uniform size whereby regardless of the base dimensions of the load, the load may be readily deposited upon the P and D station or any one of the load support means 27. The load carrier 40 is then positioned, as illustrated in FIG. 1 beyond the storage frame 20 into the supplemental framework 30. The elevator 44 is raised by the motor and gear means 156 to a level whereby the outer and upper frame 161 of the extractor is just below a pallet bridged across the angle supports 81. Said extractor is then moved laterally out of the aisle by suitable power means (not shown) until the outer frame 161 is immediately below the pallet. Motor and gear means 156 move the elevator 44 upwardly a sufficient distance to lift the load off of the P and D station after which the extractor retracts into the elevator, carrying the load with it. By combined operation of the drive means 107 of the carriage 41 and the gear and drive means 156, working either sequentially or in unison, the loaded elevator 44 is moved to the selected bay and load support means at which point the carrier stops. When the elevator 44 is loaded, its vertical movement is stopped at a position whereby the outer and upper frame 161 is disposed slightly above the horizontal flanges 54 of the pair of ledge members 52 which constitute the selected load support means 27. The outer frame is then moved laterally between the selected ledge members after which the elevator 44 is slightly lowered to deposit the load bridgelike across said selected ledge members. The extractor is then retracted and the entire carrier is moved back to the P and D station.

If the carrier is to pick up a load from the storage frame 20, the operations described are reversed with the extractor moving out of the aisle below a stored load, moving upwardly to pick it up, and then retracting to take it back into the elevator whereby it is transported to the P and D station. At the P and D station, the elevator is raised whereby the load is disposed slightly above the angle supports 81 after which the extractor moves laterally outwardly and the elevator moves downwardly to deposit the load at the P and D station.

Because the loads are cantilevered laterally for purposes of depositing and picking up, when the elevator 44 is a substantial distance above or below the horizontal tracks 34, there will be a tendency for the vertical tracks to rotate about a horizontal axis which is disposed parallel with the length of the aisle in the center of the carriage 41. The pivoting effect is effectively offset by the lower rectangular frame 120 and its flanged rollers 122 bearing against the lowermost inner stringers 71. Any consequent lateral bowing or deflecting of the long expanse of the vertical tracks between the carriage and the top or bottom of the vertical tracks is effectively prevented by the diagonal braces 135. Further stabilizing of the carrier in a lateral direction is optionally available by use of the alternate rectangular frame 126 at the top of the mast as shown in broken line in FIG. 15.

If, by accident, the extractor 160 moves to enter a storage frame section 21 or 22 when not in full registry with a bay 26, said extractor will strike an aisle post 50, and an abnormal transverse load or force will be exerted against said section. If this occurs, the transverse load or force will be transmitted to the entire storage frame, i.e., both sections, through the carriage 41. The flanges of the upper channel members 90 of the tracks 34 confine the wheels 42 thereby limiting their transverse movement. This has the effect of tying the two sections of the storage frame together intermediate the top and bottom of the structure in the area in which the transverse load occurs. The carriage 41 strengthens the storage frame at all times in the vertical, transverse plane where the extractor action is taking place and is particularly important with respect to transverse loads or forces acting on the storage frame when said frame is heavily loaded and a side force buckle an aisle post.

As hereinabove discussed, stopping and starting of the carrier in the direction of the aisle will tend to cause a pendulum action at the ends of the vertical track, particularly if the elevator 44 is at that time located adjacent to one of said ends. This effect is offset by the fact that the vertical tracks are connected together in three horizontal planes, at their upper and lower ends and about halfway intermediate said ends. The pendulum action is further offset by the long wheel base of the carriage 41, the diagonal struts 112 and 113, and the diagonal braces 130, 131, 132 and 134.

Vertical stop control means for the elevator 44 is preferably provided, said stop means, as herein illustrated, comprising a leveling switch means 190 carried by said elevator and actuable by a plurality of trips or indicia 191 carried by one of the vertical tracks 43 (FIGS. 6 and 13). A trip 191 is provided at each load level, and by suitable automatic control means, the elevator is caused to stop where the switch means 190 is tripped at a selected level.

By locating the tracks 34 upon the storage frame itself and independently of the floor F, a constant relationship between said storage frame and the carrier is maintained. Therefore, if in leveling the elevator 44 at the different load support means a leveling switch and trip means is used as disclosed, the trip means may be provided on one of the vertical tracks instead of on the storage frame itself because any vertical deflection of the storage frame will be transferred to the carrier through the tracks 34 thereby assuring a constant relationship between any predetermined position of the vertical tracks where the elevator is stopped and any given load support means level.

FIGS. 22 and 23 show a slightly modified version of the storage frame and load carrier, this modification comprising a lowering of the horizontal tracks carried by the aisle posts; increasing the size and, therefore, the load capacity of the aisle posts; and eliminating all horizontal stringers from the aisle posts except the uppermost and lowermost of said stringers. In all other respects, the storage frame and load carrier remain the same in the second embodiment as in the first, and the details thereof will not be repeated. Only those parts of the modified storage frame and carrier which are necessary to a description of the modification will be referred to, and parts which are similar or identical to those shown in the first embodiment will be referred to by the same number primed.

First of all, it will be noted that the modified storage frame, indicated at 20', is provided with aisle posts 50' which are substantially heavier and, therefore, stronger than the aisle posts 50 of the first embodiment. Said aisle posts 50' are connected to outer posts 51' by ledge members 52' which define a plurality of vertically spaced load support means 27'. The inner posts 50' carry tracks 34' disposed just below the sixth load carrying level, counting upwardly, which said position is slightly below the center of the storage frame. Although the dimensions may vary somewhat, in a typical storage system wherein the storage frame is thirty-one feet high, the tracks 34' would be positioned approximately thirteen feet above the floor level F'. This places the tracks 34' approximately 42% of the distance up the storage frame although the distance may vary generally from 35% to 45% of the distance as measured upwardly from the floor F'.

The cross members 69' tie the two storage frame sections together across the top, said sections being indicated at 21' and 22'. The outer posts 51' are connected together longitudinally of the storage frame by outer stringers 70' which, in this form of the invention, are shown as angle-shaped members but which may be in the form shown at 70 in the first embodiment. The aisle posts 50' are connected together adjacent to the top of the storage frame and adjacent to the bottom thereof by inverted, U-shaped stringers 71' which may, of course, be T-shaped as are the stringers 71 in the first embodiment. One flange of each stringer 71' receives the rollers of a rectangular lower frame 120' and a rectangular upper frame 126' of a load carrier 40'.

Referring now particularly to FIG. 23, but also to FIG. 22, it will be noted that there are no inner or aisle stringers 71' between the uppermost and lowermost of said stringers. Only the tracks 34' connect the rows of aisle posts 50', said tracks being disposed slightly below the middle of the storage frame, as hereinabove explained. It has been found that with this combination of enlarged aisle posts and lowered track level, intermediate stringers between said track and the upper and lowermost of said stringers can be eliminated. This decreases the height of a storage frame structure for any given vertical load capacity and also affords a saving in cost with relation to the eliminated stringers. By placing the track below center, it is possible to carry more load on the heavily loaded lower portion and more fully utilize the capacity of the more lightly loaded upper portion of the aisle posts without using stringers intermediate the track at either the bottom or top of the storage frame.

The warehousing system of the present invention provides a storage frame and carrier means therefor which is of lightweight but sturdy construction and which is relatively inexpensive to build because of the extensive use of relatively light, thin structural members of conventional form. This type of storage system is extremely adaptable for solving the storage problems of individual manufacturers and warehousemen because it can be readily modified to fit available storage spaces of various sizes and shapes either indoors or outdoors. The storage frame is structurally self-contained in that it does not necessitate the construction of a particular type of warehouse building or the tying in of the storage frame to structural members of the building, such as the walls, overhead beams or supporting pillars. The problems of rigidity and alignment of the parts, so critical in an automatic system having a minimum of operator control, are solved by the use of trussing as a core or inner framework, around and upon which the storage frame and carrier are constructed, and adjustable bracing at the outside of the storage frame. Substantially all of the stresses caused by the weight and movements of the carrier and the shifting of the center of gravity of the carrier due to the cantilevering of loads are ultimately directed against and withstood by this inner framework. The carrier is totally supported by the trussed tracks 34 which constitute the most rigid and sturdy portion of the storage frame and which may be considered as the spine or backbone of the entire system.

What I claim is:

1. An article handling apparatus comprising a vertically movable support means, a U-shaped base member attached to said support means, first roller means rotatable about a horizontal axis, second roller means rotatable about a vertical axis, a pair of rack means and power driven gear means each mounted in horizontally spaced relation on said base member, a first member supported and guided by said first and second roller means, respectively, on said base member for rectilinear movement into and out of said base member, rack means mounted on said first member with one horizontal side thereof being in operative engagement with said power driven gear means to facilitate movement of said first member, opposed vertical sides of the last mentioned rack means being engageable with said second roller means, gear and roller means longitudinally spaced on said first member in the direction of movement of said first member for rotation about parallel horizontal axes, a second member with guide means mounted on spaced end portions thereof and operatively engaged with said roller means on said first member to support said second member for rectilinear reciprocal movement in a direction parallel and relative to said first member, rack means mounted on said second member laterally inwardly of said guide means, said gear means on said first member being operatively engaged with the rack means on said base and second member.

References Cited

UNITED STATES PATENTS 2,788,905   4/1957   Grove              214—95
3,175,722   3/1965   Paulssen          214—731

GERALD M. FORLENZA, *Primary Examiner.*

RAYMOND B. JOHNSON, *Assistant Examiner.*